(12) United States Patent
Balsotti et al.

(10) Patent No.: US 10,330,215 B2
(45) Date of Patent: Jun. 25, 2019

(54) PNEUMATIC VALVE FOR ACTUATING PEDALS OF A TIRE CHANGER

(71) Applicant: Snap-on Equipment Srl a unico socio, Correggio (IT)

(72) Inventors: Luigi Balsotti, Perugia (IT); Davide Balugani, Castelfranco Emilia (IT); Roberto Rosi, Serramazzoni (IT); Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 154 days.

(21) Appl. No.: 15/366,527

(22) Filed: Dec. 1, 2016

(65) Prior Publication Data

US 2018/0154712 A1 Jun. 7, 2018

(51) Int. Cl.
*F16K 31/122* (2006.01)
*F16K 11/07* (2006.01)
(Continued)

(52) U.S. Cl.
CPC .......... *F16K 31/1221* (2013.01); *F16K 11/07* (2013.01); *F16K 31/143* (2013.01);
(Continued)

(58) Field of Classification Search
CPC ... B60C 29/002; B60C 25/132; B60C 29/068; B60C 25/138; F16K 31/1221;
(Continued)

(56) References Cited

U.S. PATENT DOCUMENTS 3,220,695 A * 11/1965 Jones ........................ E03C 1/23
251/230
4,116,216 A * 9/1978 Rosenberg ........... A01G 25/162
137/624.13
(Continued)

FOREIGN PATENT DOCUMENTS

CA 2803352 A1 * 7/2014 ....... F16K 31/52483
CN 201442498 U 4/2010
(Continued)

OTHER PUBLICATIONS

Extended European Search Report EP Application No. 16201781.8 dated Apr. 24, 2017.
(Continued)

*Primary Examiner* — Marina A Tietjen
(74) *Attorney, Agent, or Firm* — Miles & Stockbridge PC

(57) ABSTRACT

A pneumatic valve unit for use in a tire changer for selectively connecting at least one pressure source of the tire changer to at least one operating member of the tire changer upon successive operation of at least one pedal of the tire changer, the pneumatic valve unit comprising a pneumatic valve with a valve housing and a plunger axially slidably received in the valve housing, the plunger being operatively coupled to the pedal and movable between at least two predetermined axial positions upon successive operation of the pedal, and a selection mechanism for selectively connecting the pressure source to the operating member upon successive operation of the pedal, wherein the selection mechanism comprises a selector housing for axially slidably receiving the plunger therein, a cam body comprising a plurality of cam surfaces, a spacer body comprising a plurality of spacer surfaces for acting together with the cam surfaces, and a biasing means for biasing the spacer body towards the cam body.

13 Claims, 9 Drawing Sheets

(51) Int. Cl.
*F16K 31/528* (2006.01)
*F16K 31/52* (2006.01)
*F16K 31/143* (2006.01)
*F16K 31/163* (2006.01)
*B60C 25/138* (2006.01)

(52) U.S. Cl.
CPC .......... *F16K 31/163* (2013.01); *F16K 31/523* (2013.01); *F16K 31/5286* (2013.01); *B60C 25/138* (2013.01)

(58) Field of Classification Search
CPC ............... F16K 31/52483; F16K 31/56; F16K 11/07–11/0716; F16K 11/078–11/0782; F16K 31/5286; F16K 31/523; F16K 31/52; F16K 31/52475; F16K 31/143; F16K 31/163
See application file for complete search history.

(56) References Cited

U.S. PATENT DOCUMENTS

| | | | | |
|---|---|---|---|---|
| 4,221,236 | A * | 9/1980 | Rosenberg | A01G 25/162 137/624.11 |
| 4,221,238 | A * | 9/1980 | Madsen | F16K 31/528 137/627.5 |
| 4,222,426 | A * | 9/1980 | Brosene, Jr. | B60C 25/025 157/1.28 |
| 4,356,841 | A * | 11/1982 | Milberger | E21B 33/0355 137/624.18 |
| 7,543,622 | B1 | 6/2009 | Carpenter et al. | |
| 8,973,610 | B2 * | 3/2015 | Ma | F15B 13/0422 137/596.14 |
| 9,939,071 | B2 * | 4/2018 | Lin | E03C 1/0409 |
| 2018/0051816 | A1 * | 2/2018 | Lin | E03C 1/0409 |

FOREIGN PATENT DOCUMENTS

| | | | |
|---|---|---|---|
| CN | 205036896 U | 2/2016 | |
| EP | 1323500 A2 * | 7/2003 | ............ B25B 21/02 |
| FR | 2957648 A1 | 9/2011 | |
| GB | 2494902 A | 3/2013 | |
| JP | 2008-291984 | 12/2008 | |

OTHER PUBLICATIONS

Office Action dated Apr. 9, 2019 for European Application No. 16 201 781.8.

* cited by examiner

PNEUMATIC VALVE FOR ACTUATING PEDALS OF A TIRE CHANGER

BACKGROUND

1. Field of the Invention

The present disclosure relates to a pneumatic valve unit for use in a tire changer.

2. Background Discussion

A tire changer comprises a number of pneumatically driven components, such as a bead breaker arm, a bead breaker blade, a turntable and clamping jaws of the turntable. Further, a tire changer comprises an inflator for inflating a tire to be mounted on the turntable. A pressure tank is generally provided as a source of pressurized air for the various operating members. To connect the pressure source to an operating member or to connect the pressure source to another operating member, a linear pneumatic valve is used.

CN 201442498 U discloses a pneumatic valve unit for use in a tire changer. The pneumatic valve unit is used for selectively connecting a pressure source to a turntable of the tire changer. The pneumatic valve unit comprises a linear pneumatic valve which has a valve housing and an axially moveable plunger received therein. A spring loaded foot pedal of the tire changer is pivotably supported by a shaft. The shaft also pivotably supports an attachment plate to which a first end of a lever is coupled. The second end of the lever is coupled to a cam mechanism positioned laterally of the pneumatic valve. By depressing the pedal, the attachment plate is pivoted forwardly. This movement is transmitted to the lever, causing the second end of the lever to be guided by the cam mechanism until the cam mechanism prevents further movement of the second end of the lever and thus of the pedal. Then, the pedal has reached a predetermined position. The shaft is also coupled to a control rod which, in turn, is coupled to the plunger. Depressing the pedal causes the plunger to move axially within the pneumatic valve. In this way, each predetermined position of the foot pedal corresponds to a predetermined axial position of the plunger within the pneumatic valve.

It is further known to use, in a pneumatic valve unit for use in a tire changer, a pneumatic spool valve. A spool of the known pneumatic spool valve is coupled to a spring loaded foot pedal of the tire changer. The spool valve extends generally horizontally and is used to selectively connect a pressure source to different operating members of the tire changer. The foot pedal is also coupled to one end of a lever, wherein the other end of the lever has a pin orthogonally projecting therefrom. The pin is movably received in a guiding block. The guiding block is positioned laterally of the spool valve and adapted to guide the pin along a closed guide path. The guide path extends in a vertical plane parallel to the direction of extension of the spool valve and is formed with a first, a second and a third trough. The first and second troughs are horizontally separated by a vertically extending first peak and the second and third troughs are horizontally separated by a vertically extending second peak. The guide path further has a straight section connecting the first and third troughs with each other. Upon successive operation of the foot pedal, the pin is moved along the guide path from the first troughs to the second and third trough, and finally, upon the action of the spring, back to the first trough along the straight section. Thus, the pin is successively movable into one of three predetermined positions, each position corresponding to an associated trough and to a different level of depression of the pedal. Each predetermined position of the foot pedal, in turn, corresponds to a predetermined axial position of the spool within the spool valve. In this way, upon successive operation of the foot pedal, the spool is movable through three predetermined axial positions, wherein each axial position of the spool connects the pressure tank to a different operating member.

SUMMARY OF THE INVENTION

The present disclosure relates to a pneumatic valve unit for use in a tire changer for selectively connecting at least one pressure source of the tire changer to at least one operating member of the tire changer upon successive operation of at least one pedal of the tire changer, the pneumatic valve unit comprising a pneumatic valve comprising a valve housing defining a valve chamber, the valve housing having at least one inlet for fluidly connecting the valve chamber to the pressure source, and at least one outlet for fluidly connecting the valve chamber to the operating member, and a plunger axially slidably received in the valve housing, the plunger being operatively coupled to the pedal and movable between at least two predetermined axial positions upon successive operation of the pedal so as to selectively connect the operating member to the pressure source, and a selection mechanism for selectively connecting the pressure source to the operating member upon successive operation of the pedal.

It is an object of the present disclosure to provide a pneumatic valve unit of the above-mentioned type for use in a tire changer that is more compact than known pneumatic valve units for use in a tire changer. In particular, it is an object of the present disclosure to provide a pneumatic valve unit of the above-mentioned type that has a reduced height and/or width compared to known pneumatic valve units for use in a tire changer.

The object is solved by a pneumatic valve unit of the above-mentioned type, wherein the selection mechanism comprises a selector housing for axially slidably receiving the plunger, a cam body comprising a plurality of cam surfaces, a spacer body comprising a plurality of spacer surfaces for acting together with the cam surfaces, and a biasing means for biasing the spacer body towards the cam body, wherein, when the pedal is released, the selection mechanism is adapted to axially and rotationally restrain the plunger in one of the predetermined axial positions and the spacer body in one of at least two predetermined rotative positions relative to the plunger, and, when the pedal is operated, the selection mechanism is adapted to release the rotational restraint of the spacer body and subsequently allow the spacer surfaces of the spacer body to act together with the cam surfaces of the cam body so as to cause the spacer body to unidirectionally rotate to another one of the predetermined rotative positions such that, upon release of the pedal, the plunger moves to another one of the predetermined axial positions.

In other words, in a pneumatic valve unit of the present disclosure, the selection mechanism, upon actuation of the plunger, is arranged to first provide an axial forced guidance of the spacer body of the selection mechanism, and to subsequently provide an axial and rotational cam controlled guidance of the spacer body. The plunger is actuated by operation of the pedal. Thus, under forced guidance, the spacer body moves only axially, while under cam controlled guidance, the spacer body moves both axially and rotationally.

According to the present disclosure, the selection mechanism acts directly with the plunger. In known pneumatic valve units, the cam mechanism acts together with a lever provided in addition to the plunger. Since in a pneumatic valve unit of the present disclosure there is no need to provide an additional component laterally offset from the plunger, it requires less space (construction width) and is therefore more compact than known pneumatic valve units. Moreover, the cam mechanism of known pneumatic valve units guides the lever along a curved path such that the lever performs a movement having a component parallel to the direction of movement of the plunger and a component orthogonal thereto. In other words, the lever of the known pneumatic valve unit has two translational degrees of freedom. In contrast, the selection mechanism of the pneumatic valve unit of the present disclosure has only one translational degree of freedom and one rotational degree of freedom. This reduces the space (construction height) required by the pneumatic valve unit of the present disclosure in comparison to the space required by known pneumatic valve units.

According to a preferred embodiment, the cam body is fixedly connected to the plunger. The cam body and the plunger may also be formed integrally with one another. In this way, the cam body and the plunger may move in unison. This has the effect that restraining the rotational movement of the cam body also restrains the rotational movement of the plunger. This is particularly preferred when the pneumatic valve is a linear pneumatic valve, such as a linear spool valve.

It is further preferred that the spacer body has a central bore for receiving the plunger therein. This allows the spacer body to be axially slidably and rotatably received on the plunger. In this way, the spacer body may be the only component of the selection mechanism performing a rotational movement upon actuation of the plunger.

According to another preferred embodiment, the selector mechanism further comprises at least one axially extending stop member for acting together with the cam surfaces of the cam body and the spacer surfaces of the spacer body. Preferably, the stop member protrudes radially inwardly from the selector housing into a selector chamber defined by the selector housing. Preferably, the selector housing is provided with a pair of parallel, longitudinally inwardly protruding stop members at a rear end portion of the selector housing. The at least one stop member may be formed separately from or integrally with the selector housing. If the selector housing is held stationary, i.e., axially and rotationally restrained, the stop member is also stationary. This may be achieved, for instance, by fixedly attaching the selector housing to a stationary pedal bracket. In this case, no rotational movement is transmitted from the stop member to the cam body.

To reduce the axial length of the pneumatic valve unit, one end of the selector housing may be fixedly connected to one end of the valve housing. Preferably, a rear end portion of the valve housing is fixedly secured to a front end portion of the selector housing.

The axial length of the pneumatic valve unit may be further reduced by axially and rotatively spacing the at least one inlet and the at least one outlet from one another. For example, the at least one outlet may be inclined between 40° and 60°, while the at least one inlet may be inclined between 120° and 140° relative to a horizontal plane through the longitudinal axis of the plunger.

Further, it is preferred that the selector housing encloses a selector chamber such that the selector mechanism may not become blocked by loose parts or dirt.

The selector mechanism may further comprise a limiting member arranged on the plunger for limiting axial movement of the spacer body. The limiting member may be formed separately from or integrally with the plunger. The limiting member may also limit the extent of operation of the pedal. For instance, the limiting member may indicate a maximum extent of depression of the pedal. Further, the limiting member may provide a shoulder for a resilient spring that may be used to bias the spacer body towards the cam body.

Preferably, the bore of the spacer body is a stepped bore. The stepped bore may have an enlarged diameter portion for receiving a first end of the resilient spring seated against the limiting member and a reduced diameter portion for providing a shoulder for a second end of the spring member to bear against. By placing the resilient spring within the bore of the spacer body and about the plunger, the axial dimension of the pneumatic valve unit may be reduced compared to the case when the second end of the resilient spring abuts an axial end of the spacer body.

It will be appreciated that any suitable elastic or resilient member may be used as a biasing member for the spacer body. Alternatively or additionally, a biasing force may also be provided pneumatically to the spacer body.

The number of predetermined axial positions may be an odd number. According to a preferred embodiment, the plunger, upon successive operation of the pedal, is successively movable between three predetermined axial positions. In this case, the pneumatic valve may be a two-way valve having one inlet and two outlets. Preferably, the pneumatic valve has two working positions, in which at least one operating member is fluidly connected to the pressure source, and one resting position, in which the operation members are fluidly disconnected from the pressure source. However, the number of predetermined axial positions is not restricted to three and more are also possible.

According to a preferred embodiment, the pedal is operated by depressing the pedal and each predetermined axial position of the plunger corresponds to a predetermined depression position of the plunger. It is preferred when the pedal is operated by foot such that the hands of an operator are free, for example, for operating a bead breaker of a tire changer.

According to a preferred embodiment, the plunger is in an initial axial position when the pedal is in an initial non-depressed position, the plunger is in a first axial position when the pedal is in a first depressed position, and the plunger is in a second axial position when the pedal is in a second depressed position, wherein the pedal is more depressed in the second depressed position than in the first depressed position. This allows an operator to intuitively operate the pneumatic valve unit.

According to a preferred embodiment, the plunger is movable from the initial axial position to the second axial position by depressing the pedal from the initial non-depressed position directly to the second depressed position. In this way, the first axial position of the plunger may be omitted, when the associated connection to an operating member is not or not yet required.

The present disclosure further relates to a tire changer comprising at least one pressure source, at least one operating member, at least one pedal and at least one a pneumatic valve unit, wherein the pneumatic valve unit is configured as described above.

BRIEF DESCRIPTION OF THE DRAWINGS

Other objects and advantages of the present disclosure will appear from the following description taken in connection with the appended drawings, wherein.

DETAILED DESCRIPTION OF THE INVENTION

Figure 1:
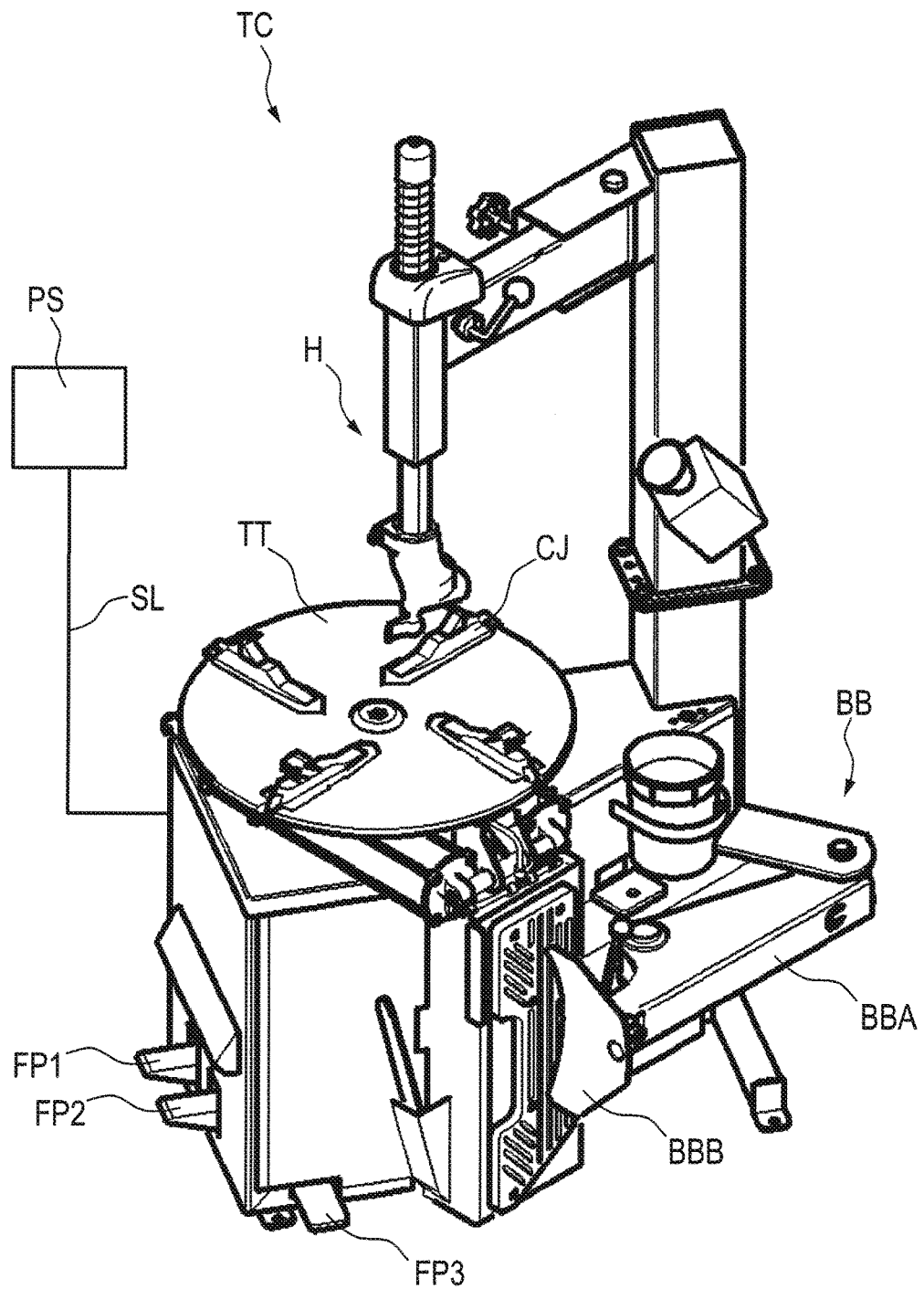
FIG. 1 is a general overview of a tire changer.

In FIG. 1, a tire changer TC is illustrated. Tire changer comprises a mount/demount head H. Tire changer TC also comprises a number of operating members. For instance, tire changer TC comprises a pneumatically operated turntable TT having pneumatically operated clamping jaws CJ for mounting a tire (not shown) thereon. Tire changer TC further comprises a pneumatically operated bead breaker BB having a bead breaker arm BBA and a bead breaker blade BBB for breaking the bead of a tire. Tire changer TC is operatively connected to a pressure source PS via a supply line SL. Supply line SL may be opened and closed by means of foot pedals FP1, FP2 and FP3 of tire changer TC. Thus, operation of turntable TT, clamping jaws CJ, bead breaker arm BBA and bead breaker blade BBB is controlled by operation of foot pedals FP1, FP2 and FP3.

Figure 2:
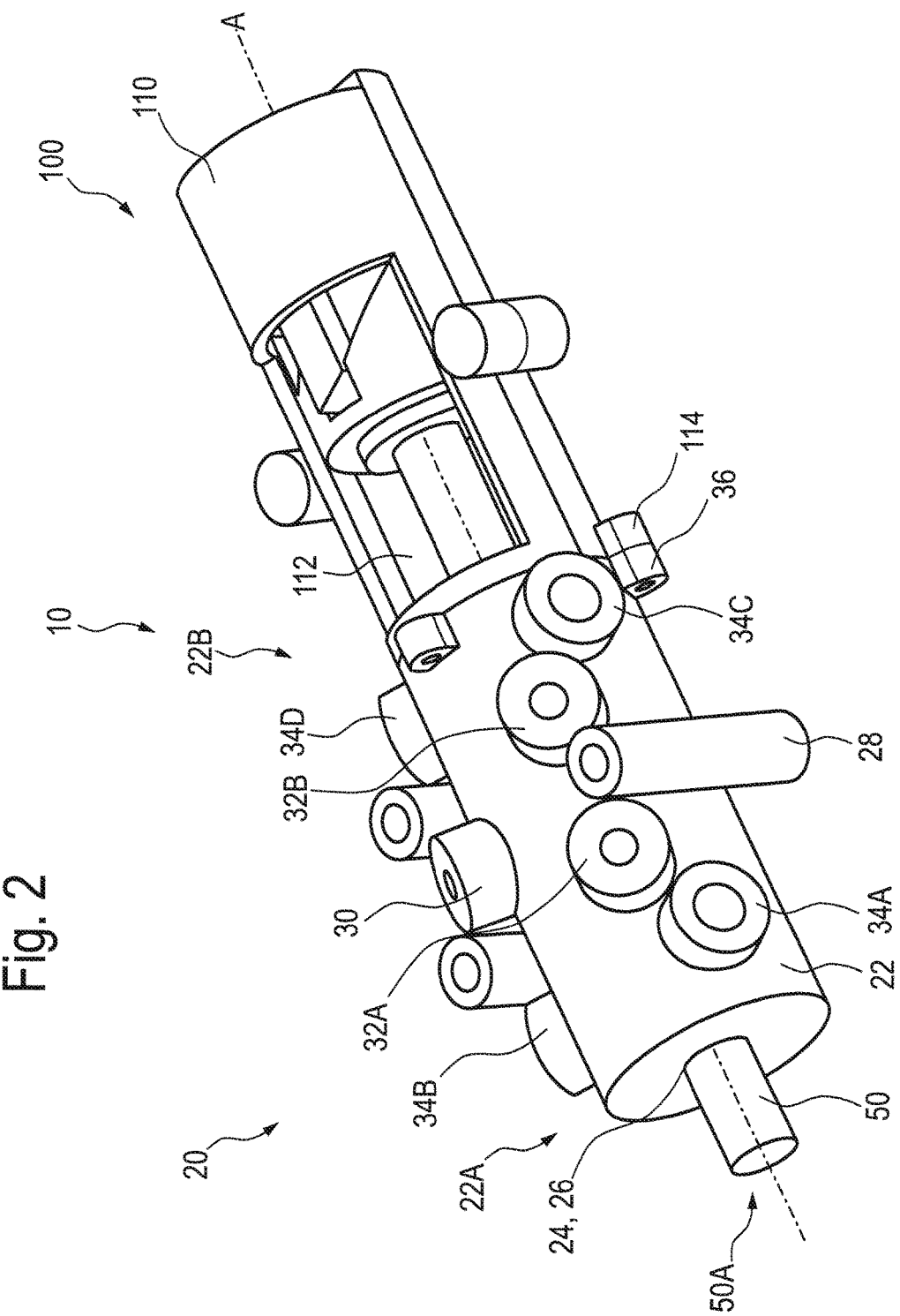
FIG. 2 shows a perspective view of a pneumatic valve unit according to an embodiment of the present disclosure.

Referring now to FIG. 2, the preferred embodiment of a pneumatic valve unit 10 comprises a pneumatic valve 20 and a selection mechanism 100. Pneumatic valve 20 and selection mechanism 100 are actuated by a cylindrical plunger 50 extending along a longitudinal axis A. Plunger 50 extends through pneumatic valve 20 and into selection mechanism 100.

Pneumatic valve 20 comprises a substantially cylindrical valve housing 22 defining a cylindrical valve chamber 26. Valve chamber 26 receives plunger 50 through an opening 24 formed at a front end portion 22A of valve housing 22. At a front end portion 50A of plunger 50, plunger 50 is coupled to a spring loaded foot pedal FP (not shown). Foot pedal FP may be any one of foot pedals FP1, FP2 or FP3. Plunger 50 is normally biased rearwardly by the spring (not shown) of foot pedal FP. Pneumatic valve 20 comprises attachment means 28 for attaching valve housing 22 to tire changer TC.

Although the terms "front," "forwardly," "rear," and "rearwardly" and the like are used to refer to relative positions or directions of movement of the various components of pneumatic valve unit 10, these terms shall not be understood to limit the arrangement of any such component within tire changer TC.

Figure 5:
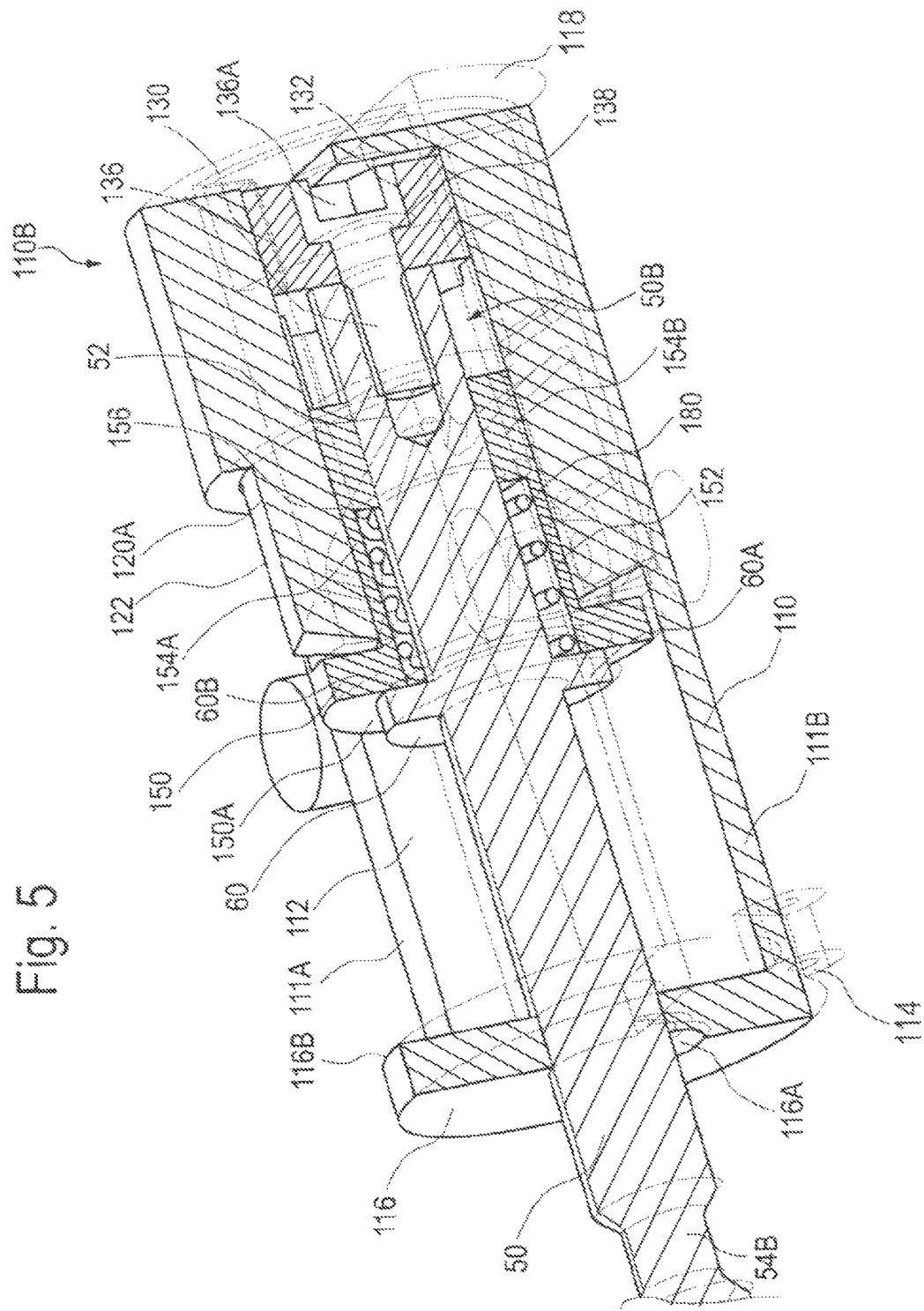
FIG. 5 shows a sectional view of a selection mechanism of the pneumatic valve unit of FIG. 2 having a spacer body and a cam body.

As can be seen in FIGS. 2 and 5, selection mechanism 100 comprises a cylindrical selector housing 110 defining a cylindrical selector chamber 112. Selector housing 110 comprises a front end plate 116 having an opening 116A and a rear end plate 118. Plunger 50 projects through opening 116A and extends through selector chamber 112. Selector housing 110 may be formed of an upper shell 111A and a lower shell 111B which may be connected in any suitable manner. Alternatively, upper shell 111A and lower shell 111B may be formed integrally with each other.

In FIGS. 2, 5 and 8(A) to 8(F), selector housing 110 is shown with a window to expose the internal components of the selection mechanism 100 which will be discussed in more detail below.

With continued reference to FIG. 2, selector housing 110 comprises fixation members 114 which may, for example, receive a bolt (not shown) to rigidly secure selector housing 110 to fixation members 36 of valve housing 22.

Valve housing 22 comprises an inlet 30 and two outlets 32A, 32B. Inlet 30 is operatively connected to pressure source PS. Each of outlets 32A, 32B may be connected to actuation means (e.g., pneumatic cylinders) associated with an operating member of tire changer TC, such as turntable TT, clamping jaws CJ or bead breaker BB. Valve housing 22 further comprises four vent silencers 34A, 34B, 34C, 34D. Vent silencers 34A, 34B are arranged near front end portion 22A of valve housing 22, while vent silencers 34C, 34D are arranged near a rear end portion 22B of valve housing 22.

In the mounted state of pneumatic valve unit 10 shown in embodiment of FIG. 2, outlets 32A, 32B are arranged at an angle of 50° relative to a horizontal plane, while inlet 30 is arranged at an angle of 130° relative to a horizontal plane. Vent silencers 34A, 34C are arranged at an angle of 25° relative to a horizontal plane, while vent silencers 34B, 34D are arranged at an angle of 155° relative to a horizontal plane. It will be appreciated that inlet 30, outlets 32A, 32B and vent silencers 34A, 34B, 34C, 34D may be arranged at other angles relative to a horizontal plane. Further, the pair of outlets 32A, 32B, vent silencers 34A, 34C and/or vent silencers 34B, 34D need not be arranged at the same angle relative to a horizontal plane. However, inlet 30, outlets 32A, 32B and vent silencers 34A, 34B, 34C, 34D are preferably so arranged that inlet 30 and outlets 32A, 32B can be connected by a hose of sorts to pressure source PS or an operating member.

Figure 3:
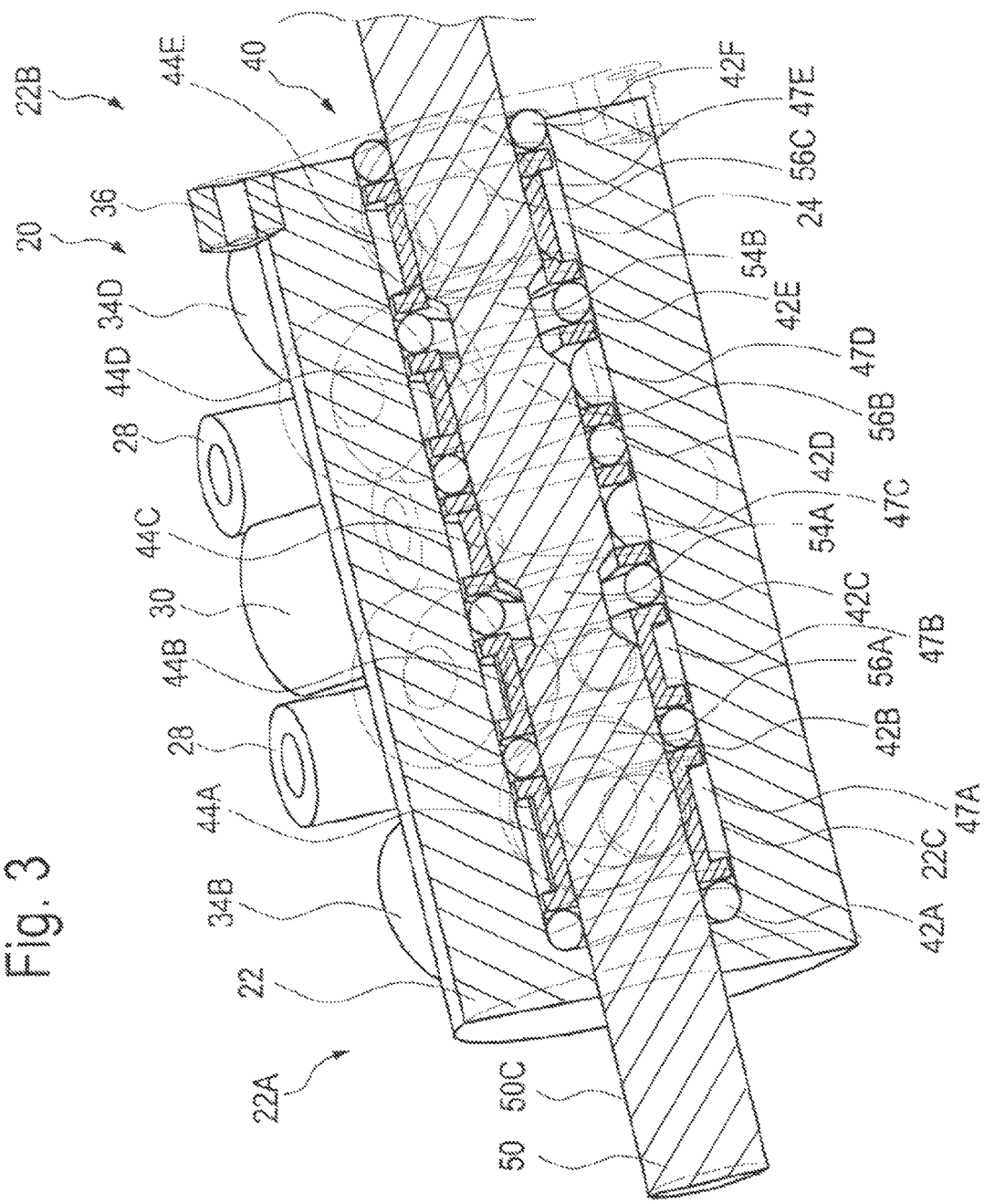
FIG. 3 shows a sectional view of a pneumatic valve of the pneumatic valve unit of FIG. 2 having a sealing assembly.

FIG. 3 is a sectional view of pneumatic valve 20. A portion of plunger 50 received within valve chamber 26 of valve housing 22 comprises a first reduced diameter portion 54A between a first portion 56A and a second portion 56B, and a second reduced diameter portion 54B between second portion 56B and third portion 56C. Thus, first reduced diameter portion 54A is axially spaced from second reduced diameter portion 54B by second portion 56B.

Snugly received within bore 24 is a sealing assembly 40 comprising sealing members 42A to 42F spaced apart by tubular bodies 44A to 44E, respectively. In the embodiment shown in FIGS. 3 and 4, sealing assembly 40 comprises six sealing members 42A, 42B, 42C, 42D, 42E, 42F provided in the form of O-rings and arranged between an inner surface 22C of valve housing 22 and an outer surface 50C of plunger 50.

Figure 4:
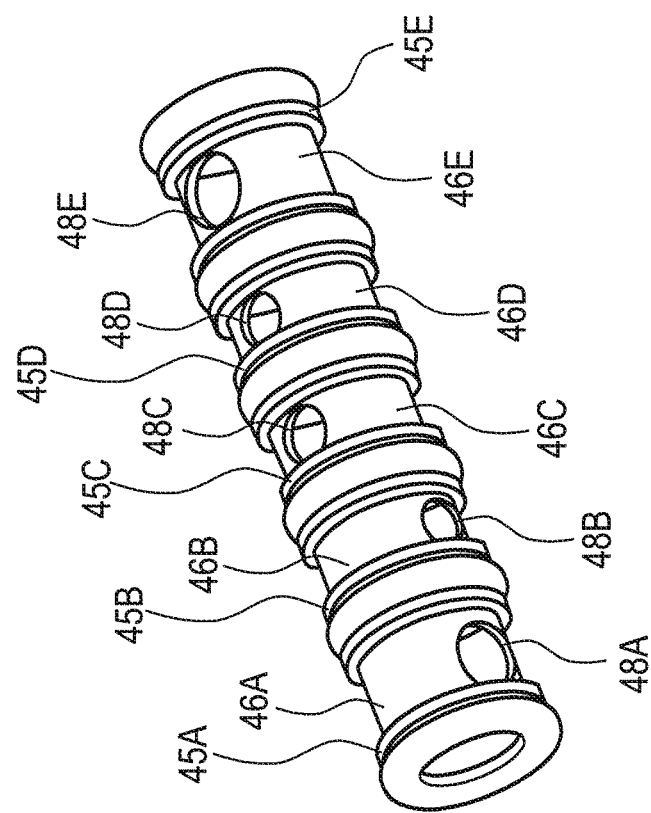
FIG. 4 shows the sealing assembly of FIG. 3 in a perspective view.

As can be seen in FIG. 4, each tubular body 44A to 44E has a pair of flanges 45A to 45E, between which a cylindrical wall 46A to 46E is located such that an annular space 47A to 47E is defined between each cylindrical wall 46A to 46E and inner surface 22C. Further, each cylindrical wall 46A to 46E is provided with an opening 48A to 48E, respectively.

Referring again to FIG. 3, tubular body 44A near front end portion 22A is positioned radially below vent silencers 34A, 34B and tubular body 44E near rear end portion 22B is positioned radially below vent silencers 34C, 34D. Tubular bodies 44B, 44D are positioned radially below outlets 32A, 32B, respectively. Tubular body 44C is positioned radially below inlet 30. Thus, inlet 30 is in fluid connection with annular space 47C and outlets 32A, 32B are in fluid connection with annular spaces 47B, 47D, respectively.

The function of pneumatic valve 20 is illustrated with particular reference to FIG. 3. In the axial position of plunger 50 depicted in FIG. 3, first reduced diameter portion 54A is positioned between outlet 32A and inlet 30 such that sealing member 42C may be bypassed (FIG. 2). In this way, outlet 32A and inlet 30 are fluidly connected via annular space 47B, opening 48B, reduced diameter portion 54A, opening 48C and annular space 47C so as bring pressure source PS into fluid communication with an operating member coupled to outlet 32A. Second reduced diameter portion 54B is positioned between outlet 32B and vent silencers 34C, 34D such that sealing member 42E may be bypassed (FIG. 2). In this way, outlet 32B and vent silencers 34C, 34D are fluidly connected via annular space 47D, opening 48D, reduced diameter portion 54B, opening 48E and annular space 47E. This allows pressure in an operating member coupled to outlet 32B to be relieved by vent silencers 34C, 34D. Fluid communication between inlet 30 and outlet 32B is prohibited by sealing member 42D.

With reference to FIG. 5, a rear end portion 50B of plunger 50 has a threaded blind hole 52 formed therein. A cam body 130 having an opening 132 is attached to rear end portion 50B of plunger 50 by means of a screw 136 received through opening 132 and threaded blind hole 52. A screw head 136A of screw 136 bears against an annular shoulder 138 formed in opening 132.

Formed integrally with selector housing 110 at a rear end 110B are two diametrically opposite stop members 120A, 120B (only stop member 120A is visible in FIG. 5) that extend parallel to axis A and protrude radially into selector chamber 112 (FIG. 2). Stop members 120A, 120B provide stop surfaces 122 described in more detail below.

Figure 6:
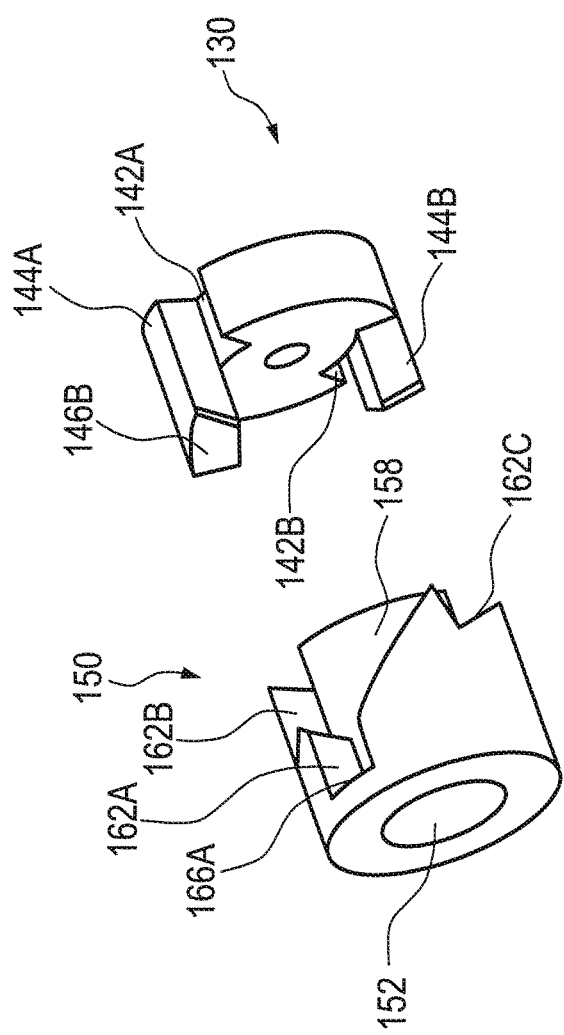
FIG. 6 shows the spacer body and the cam body of FIG. 5 in a perspective view.

As can best be seen from FIG. 6, cam body 130 comprise a pair of radially opposite slots 142A, 142B for receiving respective ones of the pair of stop members 120A, 120B. Formed integrally with cam body 130 is a pair of diametrically opposite fingers 144A, 144B extending parallel with stop members 120A, 120B. Fingers 144A, 144B provide a plurality of cam surfaces, of which only cam surfaces 146A, 146B of finger 144A are shown.

As can be seen from FIGS. 5 and 6, stop members 120A, 120B are longer in the longitudinal direction of axis A than fingers 144A, 144B. Further, stop members 120A, 120B are narrower in a circumferential direction than fingers 144A, 144B.

With reference again to FIG. 5, a spacer body 150 is rotatably and slidably disposed on plunger 50 in selector chamber 112 so as to in effect be "floating" therein. Spacer body 150 has a bore 152 with a forwardly facing enlarged diameter portion 154A and a rearwardly facing reduced diameter portion 154B providing a shoulder 156. A ring-shaped protrusion formed on plunger 50 acts as a limiting member 60 for axial movement of spacer body 150.

As can be seen in the exemplary embodiment of FIG. 6, spacer body 150 is provided, in total, with three pairs of recesses for selectively receiving and acting together with the pair of stop members 120A, 120B and the pair of fingers 144A, 144B. Of the three pairs of recesses, only an initial recess 162A, a first recess 162B and a third recess 162C can be seen in FIG. 6. The depicted recesses 162A, 162B, 162C provide a plurality of spacer surfaces 164A to 164C, 166A to 166C, 168, 170. Spacer body 150 further comprises a central hub 158 of such diameter as to slidably fit between fingers 144A, 144B.

A resilient spring 180 is received within bore 152 of spacer body 150 and surrounds plunger 50. Resilient spring 180 is seated against a rear surface 60B of ring-shaped limiting member 60 and bears against shoulder 156 formed by reduced diameter portion 154B of spacer body 150. Resilient spring 180 biases spacer body 150 towards cam body 130.

Figure 7A:
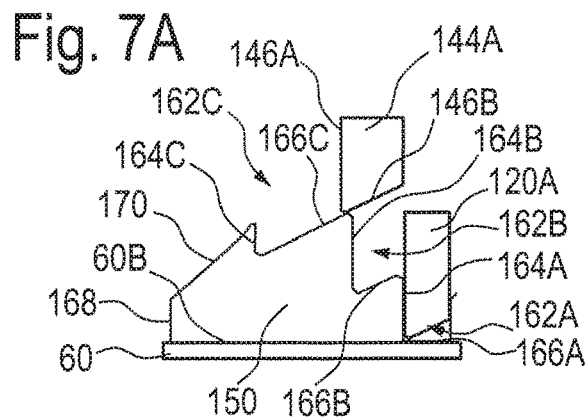
FIGS. 7(A)-7(S) show a schematic illustration of the working principle of the selection mechanism of the pneumatic valve unit of FIG. 2 in successive operational steps.
Figure 7F:
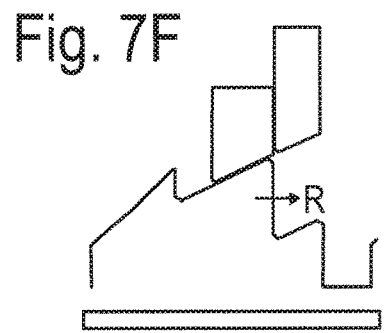
Figure 7B:
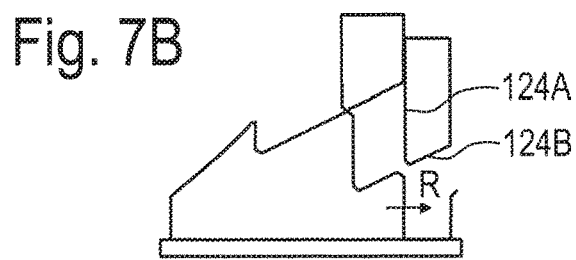
Figure 7G:
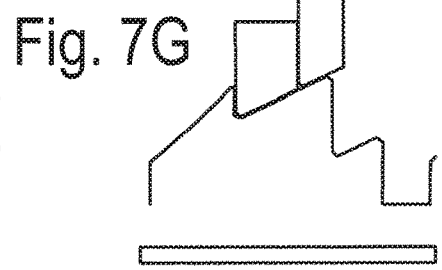
Figure 7C:
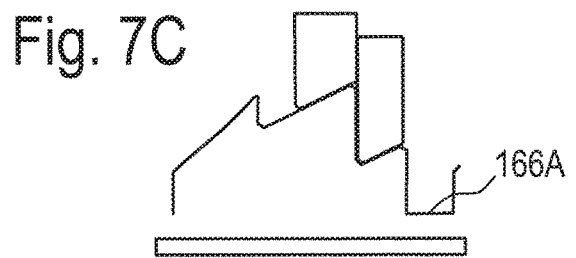
Figure 7H:
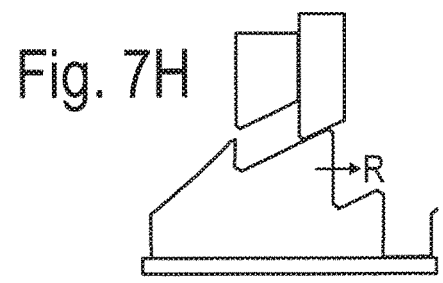
Figure 7D:
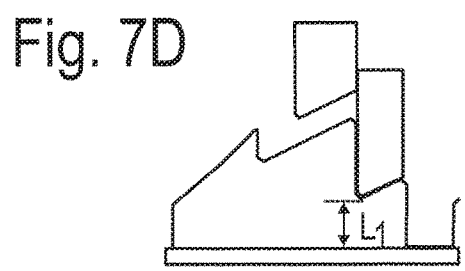
Figure 7I:
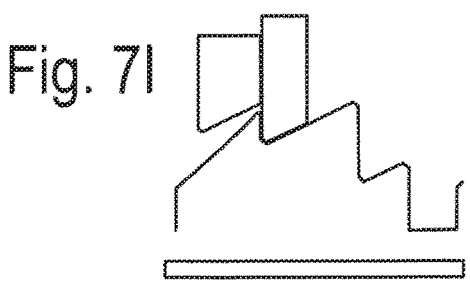
Figure 7E:
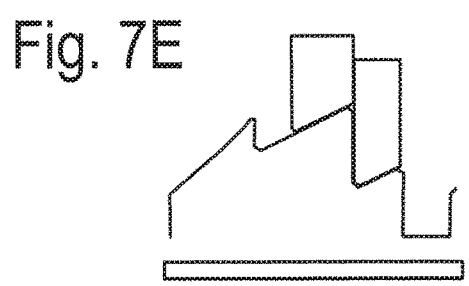
Figure 7J:
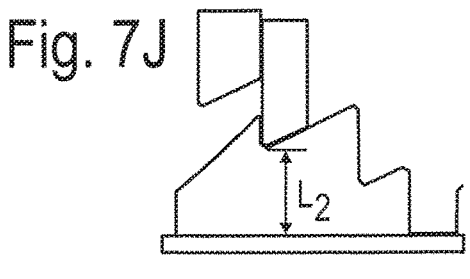
Figure 7K:
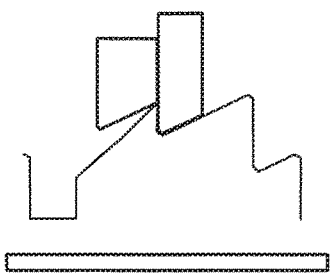
Figure 7P:
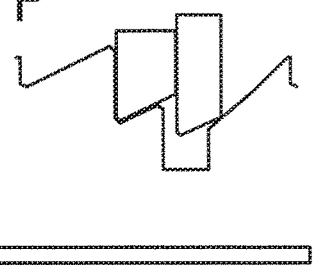
Figure 7L:
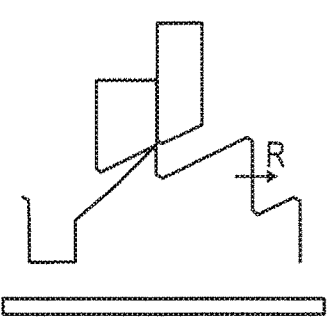
Figure 7Q:
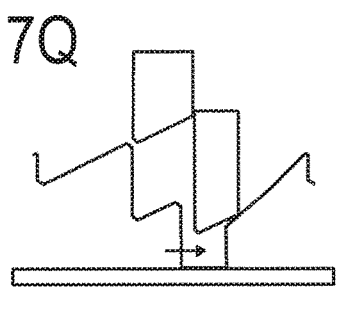
Figure 7M:
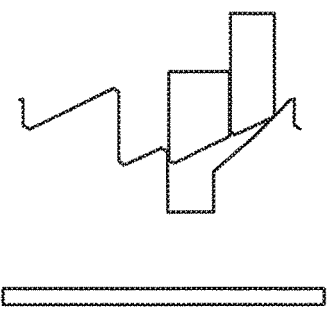
Figure 7R:
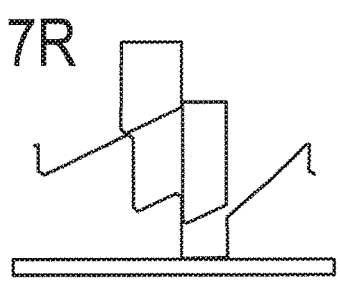
Figure 7N:
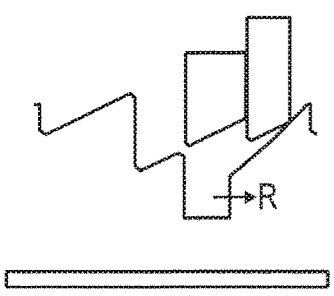
Figure 7S:
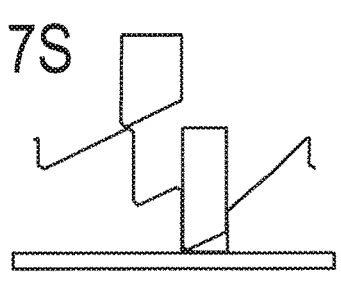
Figure 7O:
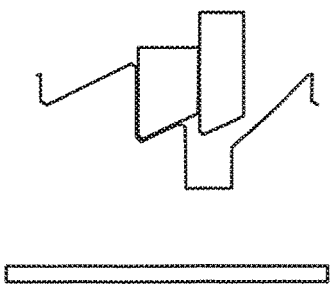

FIGS. 7A to 7S show the operation of selection mechanism 100. FIGS. 7A to 7S are diagrammatic developed views of a 180°-portion of the circumferential surface of spacer body 150 illustrating step-by-step the manner in which spacer surfaces 164A to 164C, 166A to 166C, 168, 170 of spacer body 150 are engaged alternately by cam surfaces 146A, 146B of finger 144A, stop surfaces 122 of stop member 120A. The remaining 180°-portion of spacer body 150 not shown is identical to the 180°-portion depicted in FIGS. 7A to 7S. In other words, the mechanism is arranged twice at diametrically opposite positions about axis A so that any generated forces act symmetrically and cause no tilting of any component.

As can be inferred from FIGS. 7A to 7S, initial recess 162A has a leading surface 164A extending substantially parallel to axis A, a trailing surface 166A extending substantially orthogonal to axis A and a flanking surface 168 extending substantially parallel to axis A. First recess 162B has a leading surface 164B extending substantially parallel to axis A and a trailing surface 166B extending circumferentially in a sloped manner. Second recess 162C has a leading surface 164C extending substantially parallel to axis A and a trailing surface 166C extending circumferentially in a sloped manner. Second recess 162C is connected to initial recess 162A by a funneling surface 170 extending circumferentially in a sloped manner.

Cam surfaces 146A, 146B of finger 144A comprise a leading surface 146A extend substantially parallel to axis A and a trailing surface 146B extending circumferentially in a sloped manner. Stop surfaces 122 of stop member 120A comprise a leading surface 124A extend substantially parallel to axis A and a trailing surface 124B extending circumferentially in a sloped manner. Rear surface 60B of limit member 60 extends substantially orthogonal to axis A.

Trailing surfaces 166B, 166C of spacer body 150 are oriented in the same sense and have the same slope, i.e., they are oriented so as to impart a unidirectional rotational movement to spacer body 150 when moved against trailing surfaces 146B, 124B of rotationally fixed cam body 130 and stop member 120A.

Trailing surface 146B of finger 144A and trailing surface 124B of stop member 120A are formed with a slope corresponding to that of trailing surfaces 166B, 166C of spacer body 150 and in the same sense.

As shown in FIGS. 7A to 7S, in the circumferential direction of spacer body 150, trailing surface 166B is shorter than trailing surface 166C and funneling surface 170, and trailing surface 166C is shorter than funneling surface 170. Funneling surface 170 is steeper in slope than trailing surfaces 166B, 166C. Further, in the longitudinal direction of axis A, leading surface 164C is shorter than leading surfaces 164A, 164B, and leading surface 164A is shorter than leading surface 164B.

The operation of selection mechanism 100 will now be described with particular reference to FIGS. 7A to 7S. As will be appreciated and although not shown in FIGS. 7A to 7S, the following discussion applies also to finger 144B of cam body 130 and stop member 120B of selector housing 110.

FIG. 7A shows an initial axial position P0 of plunger 50. In initial axial position P0, spring loaded foot pedal FP biases limiting member 60 towards stop member 120A such that rear surface 60B abuts front surface 150A of spacer body 150. However, for ease of reference, the following discussion refers to trailing surface 166A rather than to front surface 150A, even though these surfaces 166A, 150A are axially spaced apart in the depicted embodiment. As shown in FIG. 7A, finger 144A is positioned axially rearwardly of trailing surface 166C and abuts trailing surface 166C. Stop member 120A is received within initial recess 162A so as to prevent rotational movement of spacer body 150. Initial axial position P0 of plunger 50 corresponds to an initial non-depressed position of foot pedal FP and an initial rotational position of spacer body 150. In initial axial position P0, forwardly pointing tip of stop member 120A abuts trailing surface 166A and thus defines the axial position of plunger 50 relative to valve housing 22 and selector housing 110. In other words, in initial position P0 of plunger 50, stop members 120A, 120B limit rearward movement of spacer body 150, which in turn limits rearward movement of limiting member 60 such that plunger 50 is prevented from moving rearwardly.

When foot pedal FP is depressed from the initial non-depressed position, plunger 50 together with limiting member 60 and finger 144A of cam body 130 are moved axially forwardly under the guidance of stop member 120A. Since trailing surface 146B abuts trailing surface 166C, spacer body 150 follows the movement of plunger 50.

In FIG. 7B, spacer body 150 has been depressed to an extent sufficient to permit leading surface 124A of stop member 120A to clear leading surface 164A of spacer body 150. Spacer body 150 is free to rotate (in a rotational direction R) under the influence of the slope of trailing surfaces 146B, 166C and of resilient spring 180 which applies a constant rearward force to spacer body 150 until stop member 120A abuts leading surface 164B, as shown in FIG. 7C. In the position of FIG. 7B, the resistance of foot pedal FP to depression reduces since resilient spring 180 is free to expand, indicating to an operator to let go of foot pedal FP.

When the operator releases foot pedal FP, so as to permit rear surface 60B to move into abutment with trailing surface 166A of spacer body 150, plunger 50 moves axially rearwardly under the influence of the spring of foot pedal FP and under the guidance of stop member 120A. Plunger 50 will then reach a first axial position P1, as shown in FIG. 7D. In first axial position P1, stop member 120A is received within first recess 162B. As can be seen from FIG. 7D, in first axial position P1, plunger 50 is located forwardly compared to initial axial position P0. First axial position P1 of plunger 50 corresponds to a first depressed position of foot pedal FP and a first rotational position of spacer body 150. It will be appreciated that first axial position P1 of plunger 50 is different from its initial axial position P0 by distance L1 defined by the axial distance of the most forwardly located points of trailing surfaces 166A, 166B and that the first depressed position of foot pedal FP is different from its initial non-depressed position. Also, the first rotational position of spacer body 150 is different from its initial rotational position.

When foot pedal FP is further depressed from the first depressed position, finger 144A moves axially forwardly, under the guidance of stop member 120A, until trailing surface 146B of finger 144A abuts trailing surface 166C of spacer body 150, as shown in FIG. 7E. Further depression of foot pedal FP causes finger 144A to carry with it spacer body 150 until leading surface 164B of spacer body 150 is clear of leading surface 124A of stop member 144A and free to rotate under the influence of the slope of trailing surfaces 146B, 166C and of resilient spring 180, as shown in FIG. 7F. Trailing surface 166C of spacer body 150 slides along trailing surface 146B of finger 144A until leading surface 164C of spacer body 150 abuts leading surface 146A of finger 144A, as shown in FIG. 7G.

In the position of plunger 50 shown in FIG. 7F, resilient spring 180 is free to expand such that the resistance of foot pedal FP to depression reduces. This indicates to an operator to release foot pedal FP.

When the operator releases foot pedal FP, plunger 50 moves axially rearwardly under the influence of the spring of foot pedal FP and under the guidance of stop member 120A, as illustrated in FIGS. 7G to 7J. It will be appreciated that the positions depicted in FIGS. 7G to 7J are for illustrative purposes only. In particular, once foot pedal FP is released, spacer body 150 performs both axial and rotational movement, while plunger 50 moves axially rearwardly. In contrast, to transition from FIG. 7G to 7H and from FIGS. 7I to 7J, only plunger 50 has moved axially rearwardly and, to transition from FIG. 7H to 7I, spacer body 150 has rotated in rotational direction R and moved rearwardly. As shown in FIG. 7J, plunger 50 will finally reach a second axial position P2. In second axial position P2, stop member 120A is received within second recess 162C and plunger 50 is located forwardly compared to initial axial position P0 and first axial position P1. Second axial position P1 corresponds to a second depressed position of foot pedal FP and a second rotational position of spacer body 150. It will again be appreciated that second axial position P2 of plunger 50 is different from its initial axial positions P0 by distance L2 defined by the axial distance of the most forwardly located points of trailing surfaces 166A, 166C, and that the second depressed position of foot pedal FP is different from its initial non-depressed position and its first depressed position. Also, the second rotational position of spacer body 150 is different from its initial rotational position and its first rotational position.

When foot pedal FP is further depressed from the second depressed position, finger 144A moves axially forwardly, under the guidance of stop member 120A, until trailing surface 146B of finger 144A engages a rearward portion of funneling surface 170 of spacer body 150, as shown in FIG. 7K. In FIG. 7L, finger 144A and, under the action of finger 144A, spacer body 150 have moved to an extent sufficient to permit leading surface 124A of stop member 120A to clear leading surface 164C of spacer body 150. Spacer body 150 is free to rotate under the influence of resilient spring 180 until leading surface 146A of finger 144A abuts leading surface 164A, as shown in FIG. 7M.

In the position of FIG. 7L, the resistance of foot pedal FP to depression reduces since resilient spring 180 is free to expand, indicating to an operator to release foot pedal FP. Additionally or alternatively, limiting member 60 may be arranged such that, upon maximum depression of plunger 50, a front surface 60A of limiting member 60 abuts a rear surface 116B of front end plate 116. The maximum depression of plunger 50 may also indicate to the operator to let go of foot pedal FP.

When the operator releases foot pedal FP, plunger 50 moves axially rearwardly under the influence of the spring of foot pedal FP and under the guidance of stop member 120A, as illustrated in FIGS. 7N to 7S. Spacer body 150 is free to move axially rearwardly under the influence of resilient spring 180 until trailing surface 124B of stop member 120A engages a forward portion of funneling surface 170 of spacer body 150. This is illustrated in FIG. 7P. Once spacer body 150 has reached the axial position of FIG. 7P, further axial movement is prevented by stop member 120A such that spacer body 150 is only free to rotate, as shown in the transition from the rotational position of spacer body 150 in FIG. 7Q to the rotational position of spacer body 150 in FIG. 7R. Plunger 50 is now free to move back into initial axial position P0, as shown in FIG. 7S. FIG. 7S corresponds to the situation of FIG. 7A. At the same time, foot pedal FP reaches again its initial non-depressed position. During the axial movement of plunger 50 from initial axial position P0 and back to initial axial position P0, spacer body 150 has rotated by 180°.

It will again be appreciated that the positions depicted in FIGS. 7N to 7S are for illustrative purposes only. In particular, FIGS. 7N to 7S distinguish between axial and rotational movement of spacer body 150 and axial movement of plunger 50, although the movements of both spacer body 150 and plunger 50 may occur simultaneously and need not follow one another successively.

It should be understood that limiting member 60 and cam body 130 may be arranged at a greater axial distance from each other than shown in FIGS. 7A to 7S. In this case, cam surface 146B and trailing surface 166A may be spaced apart by an axial distance in initial position P0, contrary to the illustration in FIG. 7A. This axial distance serves as backlash or play, and may prevent jamming and facilitate a smooth interaction between limiting member 60 provided on plunger 50, cam body 130 and spacer body 150. Since the axial distance between limiting member 60 and cam body 130 is fixed due to cam body 130 being fixedly attached to plunger 50, this backlash propagates through all of FIGS. 7A to 7S. Thus, when foot pedal FP is depressed from its initial non-depressed position, spacer body 150 is pressed down by cam body 130, which follows the movement of plunger 50, only after the axial distance between cam surface 146B and trailing surface 166A has been overcome. First axial position P1 of plunger 50, shown in FIG. 7D, and second axial position P2 of plunger 50, shown in FIG. 7J, are still defined by limiting member 60 pressing against spacer body 150, which in turn presses against stop members 120A, 120B, thereby preventing further rearward movement of plunger 50.

In another embodiment, it is possible to omit first axial position P1 when starting from initial axial position P0 by depressing pedal FP from the initial non-depressed position directly to the second depressed position. In this case, in the sequence of operation as shown in FIGS. 7A to 7S, the steps of FIGS. 7D and 7E are omitted such that the transition occurs from FIG. 7C directly to FIG. 7F.

Figure 8A:
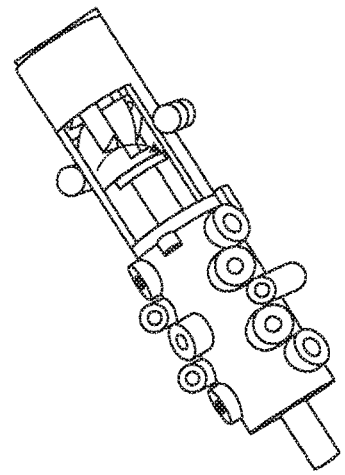
FIGS. 8(A)-8(F) show perspective views of the pneumatic valve unit of FIG. 2 in successive operational steps.
Figure 8B:
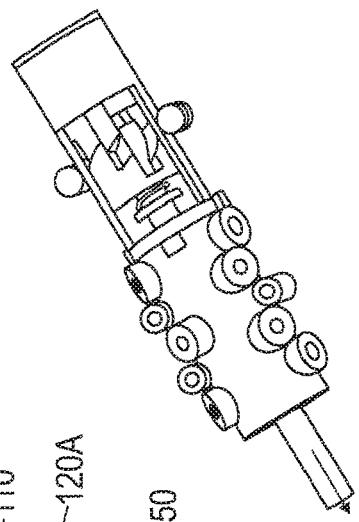
Figure 8C:
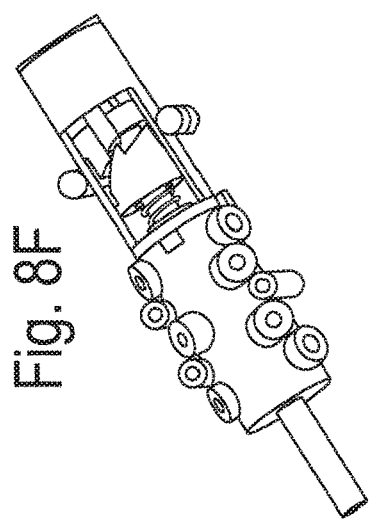
Figure 8D:
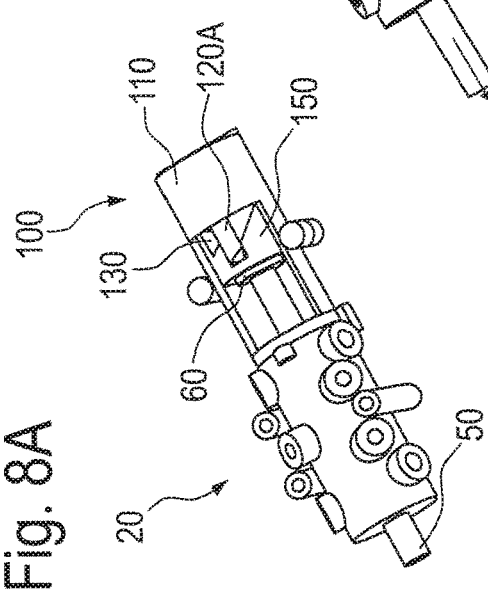
Figure 8E:
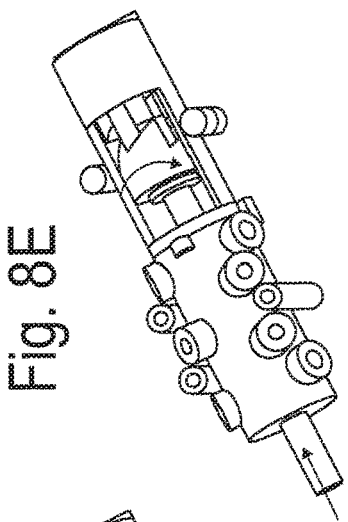
Figure 8F:
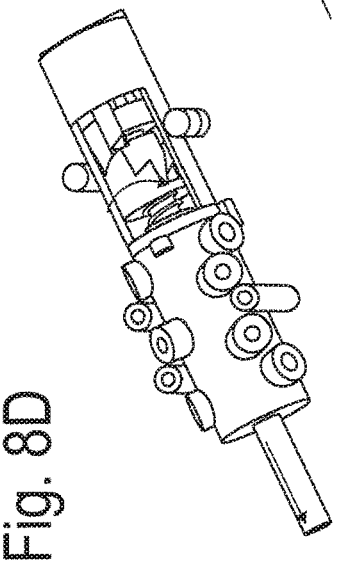

FIGS. 8A to 8F also depict the operation of pneumatic valve unit 10. In FIG. 8A, plunger 50 is in its initial axial position P0 and spacer body 150 is in its initial rotational position. In FIG. 8B, foot pedal FP has been depressed and plunger 50 moved axially forwardly such that spacer body 150 was permitted to rotate towards the first rotational position. When foot pedal FP is released, plunger 50 attains its first axial position P1, as shown in FIG. 8C. In FIG. 8D, foot pedal FP has been depressed again. Thereby, plunger 50 has moved axially forwardly and spacer body 150 has become free to rotate towards its second rotational position. When foot pedal FP is released, as shown in FIG. 8E, plunger 50 attains its second axial position P2. To return plunger 50 to initial axial position P0, foot pedal FP is depressed and released once more to permit spacer body 150 to rotate toward and into the initial rotational position. This is shown in FIG. 8F.

While exemplary embodiments have been shown and described above, it will be apparent to those skilled in the art that modifications and variations could be made without departing from the scope of the present disclosure, as defined by the appended claims.

What is claimed is:

1. A pneumatic valve unit for use in a tire changer having a pedal, the pneumatic valve unit being for selectively connecting at least one pressure source of the tire changer to at least two operating members of the tire changer by successive operation of the pedal of the tire changer, the pneumatic valve unit comprising:
   a pneumatic valve comprising:
      a valve housing defining a valve chamber, the valve housing having at least one inlet for fluidly connecting the valve chamber to the pressure source, and at least two outlets for fluidly connecting the valve chamber to the operating members,
      a plunger axially slidably received in the valve housing, the plunger being operatively coupleable to the pedal and movable between at least three different predetermined axial positions upon successive operation of the pedal such that the pneumatic valve has two working positions and one resting position, wherein in each working position one of the operating members is fluidly connected to the pressure source, and in the resting position the operation members are fluidly disconnected from the pressure source; and
   a selection mechanism for selectively connecting the pressure source to the operating members by successive operation of the pedal, wherein the selection mechanism comprises:
      a selector housing for axially slidably receiving the plunger therein,
      a cam body comprising a plurality of cam surfaces,
      a spacer body comprising a plurality of spacer surfaces for acting together with the cam surfaces, and
      a biasing means for biasing the spacer body towards the cam body,
   wherein when the pedal is in a released position, the selection mechanism is adapted to axially and rotationally restrain the plunger in one of the three predetermined axial positions and axially and rotationally restrain the spacer body in one of at least three predetermined rotative positions relative to the plunger, and, when the pedal is in an operated position, the selection mechanism is adapted to release the rotational restraint of the spacer body and subsequently allow the spacer surfaces of the spacer body to act together with the cam surfaces of the cam body so as to cause the spacer body to unidirectionally rotate to another one of the predetermined rotative positions such that, upon release of the pedal to the released position, the plunger moves to another one of the three predetermined axial positions.

2. The pneumatic valve unit of claim 1, wherein the spacer body has a central bore for receiving the plunger therein, the spacer body being axially slidably and rotatably received on the plunger.

3. The pneumatic valve unit of claim 2, wherein the selector housing encloses a selector chamber for axially slidably receiving the plunger therein.

4. The pneumatic valve unit of claim 3, further comprising a limiting member arranged on the plunger for limiting axial movement of the spacer body.

5. The pneumatic valve unit of claim 4, wherein the bore of the spacer body is a stepped bore having an enlarged diameter portion for receiving a first end of the spring member seated against the limiting member and a reduced diameter portion for providing a shoulder for a second end of the spring member to bear against.

6. The pneumatic valve unit of claim 1, wherein the selector mechanism further comprises at least one axially extending stop member for acting together with the cam surfaces of the cam body and the spacer surfaces of the spacer body, wherein the stop member protrudes radially inwardly from the selector housing into a selector chamber defined by the selector housing.

7. The pneumatic valve unit of claim 1, wherein one end of the selector housing is fixedly connected to one end of the valve housing.

8. The pneumatic valve unit of claim 1, wherein the at least one inlet and the at least one outlet are axially and rotatively spaced from one another.

9. The pneumatic valve unit of claim 1, wherein the pedal is operated by depressing the pedal and each predetermined axial position of the plunger corresponds to a predetermined depression position of the pedal.

10. A tire changer comprising at least one pressure source, at least one operating member, at least one pedal, and at least one of the pneumatic valve unit of claim 1.

11. The pneumatic valve unit of claim 1, wherein the cam body is fixedly connected to the plunger.

12. The pneumatic valve unit of claim 1, wherein the plunger is in an initial axial position when the pedal is in an initial non-depressed position, the plunger is in a first axial position when the pedal is in a first depressed position, and the plunger is in a second axial position when the pedal is in a second depressed position, wherein the pedal is more depressed in the second depressed position than in the first depressed position.

13. The pneumatic valve unit of claim 12, wherein the plunger is movable from the initial axial position to the second axial position by depressing the pedal from the initial non-depressed position directly to the second depressed position.

* * * * *